United States Patent
Cho et al.

(10) Patent No.: US 7,907,915 B2
(45) Date of Patent: *Mar. 15, 2011

(54) APPARATUS AND METHOD FOR ADAPTIVELY CHANGING UPLINK POWER CONTROL SCHEME ACCORDING TO MOBILE STATUS IN A TDD MOBILE COMMUNICATION SYSTEM

(75) Inventors: Jae-Hee Cho, Seoul (KR); In-Seok Hwang, Seoul (KR); Jang-Hoon Yang, Sungnam-si (KR); Hoon Huh, Sungnam-si (KR); Soon-Young Yoon, Seoul (KR); Sang-Hoon Sung, Suwon-si (KR); Young-Hoon Kwon, Sungnam-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/491,774

(22) Filed: Jun. 25, 2009

(65) Prior Publication Data

US 2009/0262670 A1    Oct. 22, 2009

Related U.S. Application Data

(63) Continuation of application No. 11/207,396, filed on Aug. 19, 2005, now Pat. No. 7,558,535.

(30) Foreign Application Priority Data

Aug. 20, 2004   (KR) .............................. 2004-0065952

(51) Int. Cl.
    *H04B 7/00*         (2006.01)
(52) U.S. Cl. ......................................... 455/69; 455/522

(58) Field of Classification Search .................... 455/69; 370/280
    See application file for complete search history.

(56) References Cited

U.S. PATENT DOCUMENTS

| | | | |
|---|---|---|---|
| 5,438,683 A | | 8/1995 | Durtler et al. |
| 5,487,174 A | * | 1/1996 | Persson .......................... 455/444 |
| 5,491,837 A | * | 2/1996 | Haartsen .......................... 455/62 |
| 5,564,080 A | * | 10/1996 | Eul et al. .......................... 455/69 |
| 5,623,535 A | | 4/1997 | Leung et al. |
| 5,666,651 A | | 9/1997 | Wang |
| 5,787,348 A | | 7/1998 | Willey et al. |
| 6,072,778 A | * | 6/2000 | Labedz et al. ................. 370/252 |
| 6,072,784 A | | 6/2000 | Agrawal et al. |
| 6,144,650 A | | 11/2000 | Watanabe et al. |
| 6,144,841 A | * | 11/2000 | Feeney ............................. 455/69 |
| 6,163,698 A | | 12/2000 | Leitch et al. |

(Continued)

FOREIGN PATENT DOCUMENTS

EP    0 999 657    5/2000

(Continued)

*Primary Examiner* — Yuwen Pan
*Assistant Examiner* — Hai V Nguyen
(74) *Attorney, Agent, or Firm* — The Farrell Law Firm, P.C.

(57) ABSTRACT

An apparatus and method for changing an uplink power control scheme according to mobile status in a TDD mobile communication system are provided. The communication system comprises a Subscriber Station (SS) for transmitting a power control change request message to a Base Station (BS) to change the power control scheme, and the BS for deciding to change the power control scheme between the open loop power control and closed loop power control, and transmitting a power control change response message the SS including the decided power control scheme.

12 Claims, 11 Drawing Sheets

U.S. PATENT DOCUMENTS

| | | | |
|---|---|---|---|
| 6,307,849 B1* | 10/2001 | Tiedemann, Jr. | 370/335 |
| 6,477,389 B1* | 11/2002 | Kim | 455/522 |
| 6,490,460 B1 | 12/2002 | Soliman | |
| 6,587,442 B1 | 7/2003 | Tripathi | |
| 6,697,634 B1 | 2/2004 | Hayashi | |
| 6,728,550 B1* | 4/2004 | Bohnke et al. | 455/522 |
| 6,757,537 B1* | 6/2004 | Choi et al. | 455/438 |
| 6,760,596 B1* | 7/2004 | Fiorini et al. | 455/522 |
| 6,771,660 B1 | 8/2004 | Bourlas et al. | |
| 6,842,624 B2 | 1/2005 | Sarkar et al. | |
| 6,862,457 B1 | 3/2005 | Sarkar et al. | |
| 6,891,810 B2 | 5/2005 | Struhsaker et al. | |
| 6,928,102 B2 | 8/2005 | Zeira et al. | |
| 6,940,827 B2 | 9/2005 | Li et al. | |
| 6,954,622 B2* | 10/2005 | Nelson et al. | 455/127.1 |
| 6,996,400 B2 | 2/2006 | Posti et al. | |
| 7,002,929 B2* | 2/2006 | Struhsaker et al. | 370/280 |
| 7,006,454 B2 | 2/2006 | Missel | |
| 7,010,319 B2 | 3/2006 | Hunzinger | |
| 7,010,320 B2 | 3/2006 | Komatsu | |
| 7,020,483 B2 | 3/2006 | Oestreich | |
| 7,035,231 B2 | 4/2006 | Yu et al. | |
| 7,069,035 B2 | 6/2006 | Chen et al. | |
| 7,096,019 B2 | 8/2006 | Wang | |
| 7,139,537 B2 | 11/2006 | Nakayama | |
| 7,205,842 B2 | 4/2007 | Gustavsson et al. | |
| 7,230,931 B2* | 6/2007 | Struhsaker | 370/280 |
| 7,248,841 B2 | 7/2007 | Agee et al. | |
| 7,257,101 B2 | 8/2007 | Petrus et al. | |
| 7,266,104 B2 | 9/2007 | Belcea | |
| 7,269,389 B2 | 9/2007 | Petrus et al. | |
| 7,366,247 B2 | 4/2008 | Kim et al. | |
| 7,493,136 B2 | 2/2009 | Shin et al. | |
| 7,558,535 B2* | 7/2009 | Cho et al. | 455/69 |
| 7,671,693 B2* | 3/2010 | Brobston et al. | 333/17.3 |
| 7,826,417 B2* | 11/2010 | Yang et al. | 370/329 |
| 2002/0122411 A1 | 9/2002 | Zimmerman et al. | |
| 2002/0136168 A1* | 9/2002 | Struhsaker et al. | 370/277 |
| 2002/0136169 A1* | 9/2002 | Struhsaker et al. | 370/280 |
| 2002/0136170 A1* | 9/2002 | Struhsaker | 370/280 |
| 2002/0137535 A1 | 9/2002 | Hunzinger | |
| 2002/0142791 A1 | 10/2002 | Chen et al. | |
| 2002/0159422 A1 | 10/2002 | Li et al. | |
| 2002/0160821 A1 | 10/2002 | Kaikati et al. | |
| 2002/0187784 A1 | 12/2002 | Tigerstedt et al. | |
| 2003/0003875 A1 | 1/2003 | Oestreich | |
| 2003/0045319 A1 | 3/2003 | Sarkar et al. | |
| 2003/0104816 A1 | 6/2003 | Duplessis et al. | |
| 2003/0144019 A1* | 7/2003 | Nelson et al. | 455/522 |
| 2003/0171123 A1 | 9/2003 | Laakso et al. | |
| 2004/0004944 A1 | 1/2004 | Petrus et al. | |
| 2004/0005905 A1 | 1/2004 | Petrus et al. | |
| 2004/0047328 A1 | 3/2004 | Proctor et al. | |
| 2004/0081076 A1 | 4/2004 | Goldstein et al. | |
| 2004/0085939 A1 | 5/2004 | Wallace et al. | |
| 2004/0095907 A1 | 5/2004 | Agee et al. | |
| 2004/0116139 A1 | 6/2004 | Yi et al. | |
| 2004/0146067 A1 | 7/2004 | Yi et al. | |
| 2004/0180686 A1 | 9/2004 | Nakayama | |
| 2004/0204105 A1* | 10/2004 | Liang et al. | 455/562.1 |
| 2005/0003846 A1 | 1/2005 | Anderson | |
| 2005/0048937 A1 | 3/2005 | Sarkar et al. | |
| 2005/0111398 A1 | 5/2005 | Wybenga et al. | |
| 2005/0117549 A1 | 6/2005 | Kanterakis et al. | |
| 2005/0135328 A1 | 6/2005 | Missel | |
| 2005/0164730 A1 | 7/2005 | Chen et al. | |
| 2005/0197150 A1 | 9/2005 | Sarkar et al. | |
| 2005/0243752 A1 | 11/2005 | Brueck et al. | |
| 2005/0254467 A1 | 11/2005 | Li et al. | |
| 2005/0282574 A1 | 12/2005 | Li et al. | |
| 2006/0025079 A1 | 2/2006 | Sutskover et al. | |
| 2006/0035660 A1 | 2/2006 | Anderson | |
| 2006/0040619 A1* | 2/2006 | Cho et al. | 455/69 |
| 2006/0067278 A1 | 3/2006 | Li et al. | |
| 2006/0068813 A1 | 3/2006 | Ku et al. | |
| 2006/0092875 A1* | 5/2006 | Yang et al. | 370/329 |
| 2006/0135062 A1 | 6/2006 | Takai | |
| 2006/0152285 A1 | 7/2006 | Gustavsson et al. | |
| 2006/0154685 A1 | 7/2006 | Shin et al. | |
| 2006/0215662 A1 | 9/2006 | Zhang et al. | |
| 2007/0194859 A1* | 8/2007 | Brobston et al. | 333/17.3 |
| 2007/0218889 A1 | 9/2007 | Zhang et al. | |
| 2007/0223406 A1 | 9/2007 | Li et al. | |
| 2008/0069031 A1 | 3/2008 | Zhang et al. | |
| 2008/0096576 A1 | 4/2008 | Brueck et al. | |
| 2008/0101290 A1 | 5/2008 | Sung et al. | |
| 2008/0125043 A1 | 5/2008 | Karmanenko et al. | |
| 2008/0242337 A1* | 10/2008 | Sampath et al. | 455/522 |
| 2008/0279123 A1* | 11/2008 | Struhsaker et al. | 370/280 |
| 2008/0285488 A1* | 11/2008 | Walton et al. | 370/280 |
| 2009/0215484 A1* | 8/2009 | Ishii et al. | 455/522 |
| 2009/0262670 A1* | 10/2009 | Cho et al. | 370/280 |
| 2009/0285134 A1* | 11/2009 | Struhsaker et al. | 370/280 |
| 2010/0203854 A1* | 8/2010 | Yu et al. | 455/127.1 |

FOREIGN PATENT DOCUMENTS

| | | |
|---|---|---|
| EP | 1 077 531 | 2/2001 |
| GB | 2 323 987 | 10/1998 |
| JP | 11-234202 | 8/1999 |
| JP | 2000-324049 | 11/2000 |
| JP | 2003-536347 | 12/2003 |
| JP | 2004-040187 | 2/2004 |
| JP | 2004-140604 | 5/2004 |
| JP | 2004-158965 | 6/2004 |
| KR | 1998-703493 | 11/1998 |
| WO | WO 97/40593 | 10/1997 |
| WO | WO 00/57574 | 9/2000 |
| WO | WO 01/99303 | 12/2001 |
| WO | WO 03/094384 | 11/2003 |
| WO | WO 2004/023672 | 3/2004 |

* cited by examiner

APPARATUS AND METHOD FOR ADAPTIVELY CHANGING UPLINK POWER CONTROL SCHEME ACCORDING TO MOBILE STATUS IN A TDD MOBILE COMMUNICATION SYSTEM

PRIORITY

This application is a Continuation of U.S. application Ser. No. 11/207,396, which was filed in U.S. Patent and Trademark Office on Aug. 19, 2005 now U.S. Pat. No. 7,558,535, and claims priority under 35 U.S.C. §119 to an application entitled "Apparatus And Method For Adaptively Changing Uplink Power Control Scheme According To Mobile Status In A TDD Mobile Communication System" filed in the Korean Intellectual Property Office on Aug. 20, 2004 and assigned Serial No. 2004-65952, the contents of all of which are incorporated herein by reference.

BACKGROUND OF THE INVENTION

1. Field of the Invention

The present invention relates generally to an apparatus and method for determining a power control scheme in a time division duplex (TDD) mobile communication system, and in particular, to an apparatus and method for changing an uplink power control scheme according to the status of a subscriber station (SS).

2. Description of the Related Art

As one of the duplex schemes, TDD uses two distinct sets of time slots on the same frequency for the uplink from a base station (BS) to an SS and the downlink from the SS to the BS. Another major duplex scheme is frequency division duplex (FDD). FDD uses two distinct frequencies for the uplink and the downlink.

Unlike FDD, the uplink and the downlink share the same frequency band in TDD and are separated by time slots dedicated to them. That is, time slots are separately preset for the uplink signal and the downlink signal. Therefore, the uplink and downlink signals are transmitted only in their assigned time slots. TDD has the advantage of high frequency use efficiency.

The mobile communication system schedules bursty uplink/downlink packets. Particularly, the BS decides a modulation and coding scheme (MCS) for the resources to be allocated and already allocated resources in uplink/downlink packet scheduling for an SS. An MCS level to be used depends on the status of the SS. For the uplink scheduling, the BS takes into account the maximum transmit power of the SS. Since the transmit power of the SS is restricted to a set level, the BS performs scheduling taking into account the allocated resources, an MCS level to be applied for the resources, and the transmit power limit of the SS. To do so, the scheduler of the BS must have knowledge of the power headroom or transmit power of the SS.

Typically, the mobile communication system uses downlink and uplink power control to increase call capacity and achieve good call quality. That is, if the BS receives a signal from an SS at a signal-to-interference ratio (SIR) that ensures the minimum required call quality by controlling the transmit power of all of the SSs, system capacity can be maximized. In the case where the signal from the SS is received in the BS at a higher power level, the performance of the SS is increased at the expense of increasing interference from other SSs sharing the same channel. As a result, system capacity is decreased or the call quality of other subscribers drops.

Orthogonal Frequency Division Multiplexing (OFDM)/Orthogonal Frequency Division Multiple Access (OFDMA) has recently been proposed as a physical layer scheme for a $4^{th}$ generation mobile communication system. The above-described power control has also emerged as a challenging issue to the OFDM/OFDMA system.

OFDM/OFDMA is a transmission scheme based on the IEEE 802.16 standard, in which a serial modulation symbol sequence is transmitted as parallel data. OFDM/OFDMA operates in TDD. In OFDM, 256 modulation symbols are fast-Fourier-transformed (FFT-processed) to one OFDM symbol, whereas in OFDMA, one OFDM symbol is formed with more modulation symbols. According to the IEEE 802.16-based OFDMA, the subcarriers of one OFDM symbol are grouped into subchannels and a plurality of OFDM symbols form one frame.

FIG. 1 illustrates an OFDMA frame structure specified by IEEE 802.16. The horizontal axis represents OFDM symbol indexes and the vertical axis represents subchannel indexes.

Referring to FIG. 1, an OFDMA frame is comprised of a plurality of bursts each marked by a square on a time-frequency plane. Since the frame is time-division-duplexed, the downlink period and the uplink period can be flexibly controlled. For example, $k^{th}$ through $(k+8)^{th}$ symbols are allocated to the downlink and $(k+9)^{th}$ through $(k+12)^{th}$ symbols are allocated to the uplink, as illustrated in FIG. 1. In the OFDMA frame, a DL/UL MAP burst delivers configuration information (e.g. position, length, and MCS level) about a plurality of downlink/uplink bursts allocated to the frame. The bursts other than the DL/UL MAP burst transfer a DL/UL-MAC control message and downlink/uplink data packets. Particularly, the MAC control message can be a power control change request/command message burst for controlling the power control scheme of each SS, or a power control message burst for controlling the transmit power of each SS. The bursts are time-division-multiple-accessed between SSs and the BS. Transmission gaps called transmit/receive transition gap (TTG) and receive/transmit transition gap (RTG) are inserted between the downlink and uplink periods.

Meanwhile, each SS performs initial ranging and periodic ranging to correct time and frequency errors in uplink bursts and control power. When the SS attempts ranging, the BS measures the power of a signal from the SS and transmits to the SS a MAC message including a compensation value for signal power loss caused by path attenuation and rapid signal power change.

Now a description will be made of an uplink power control method in a normal mode in the OFDM/OFDMA TDD system. The uplink power control is executed in two steps.

In the first step, the BS carries out power control. The BS scheduler determines available resources and an available MCS level for uplink transmission within the transmit power range of an SS of interest by $$\Delta P = SNR_{req} - SNR_{UL,RX} + (BW_{req} - BW_{RX}) + MARGIN_{TX} \leq \text{Headroom} \quad (1)$$

where $SNR_{req}$ and $BW_{req}$ respectively denote the required SNR and bandwidth for applying an MCS level to the current packet to be scheduled. $SNR_{UL,RX}$ and $BW_{RX}$ denote the received SNR and allocated bandwidth of a reference signal, respectively. The reference signal is a previously received uplink burst signal, a data signal or a control signal. $MARGIN_{TX}$ is a term that represents a channel change. That, this margin is set considering the difference between the time of scheduling based on Equation (1) and the actual time of transmitting an uplink signal. Headroom is the transmit power margin of the SS, calculated by subtracting the current transmit power from the maximum transmit power of the SS. The BS is assumed to have knowledge of the maximum transmit power of the SS. $\Delta P$ satisfying Equation (1) ensures that the SS transmits an uplink signal with the resources and MCS level scheduled within the limited power.

In the second step, the SS performs power control. The uplink power control is considered in two ways: closed-loop power control and open-loop power control.

The uplink closed power control is a scheme of controlling the transmit power of the SS according to a command from the BS. The BS notifies the SS of a required power increment/decrement ΔP as well as the resources and MCS level scheduled by Equation (1).

The uplink open-loop power control is a scheme of deciding the uplink transmit power in the SS itself. The BS simply tells the SS the resources and MCS level decided by Equation (1) and the SS then computes the uplink transmit power of an uplink signal to be transmitted using the allocated resources by $$P = PL_{UL} + SNR_{req} + NI_{UL,RX} + BW_{req} + MARGIN_{RX} \quad (2)$$
$$= PL_{DL} + SNR_{req} + NI_{UL,RX} + BW_{req} + MARGIN_{RX}$$
$$= PL_{DL,TX} - PL_{DL,RX} + SNR_{req} + NI_{UL,RX} + BW_{req} + MARGIN_{RX}$$

where $PL_{UL}$ and $PL_{DL}$ denote uplink and downlink path losses, respectively. In view of the TDD system, these two values are almost the same. The SS can estimate $PL_{DL}$ using the transmit power of the BS, $P_{DL,TX}$ and the downlink received power $P_{DL,RX}$ of the SS. $NI_{UL,RX}$ is the power of a signal and interference measured at a receiver of the BS, common to all of the SSs. $SNR_{req}$ and $BW_{req}$ respectively denote the required SNR and bandwidth for an MCS level to be applied to a packet. $MARGIN_{RX}$ is a term that represents the difference between the time to which Equation (2) is computed for application and the actual uplink transmission time.

FIG. 2 is a diagram illustrating a signal flow for a conventional closed-loop power control.

Referring to FIG. 2, the SS transmits a reference signal and information about the uplink transmit power of the reference signal (UL_Tx, Power) in an uplink burst to the BS in step 201.

In step 203, the BS (scheduler) calculates the received SNR of the reference signal and determines resources, an MCS level, and a power increment ΔP for the SS by Equation (1). Headroom involved in Equation (1) can be calculated using the information of the transmit power (UL_Tx, Power).

In step 205, the BS allocates the uplink resources to the SS according to the scheduling (UL_MAP) and transmits a power control command (or the power increment) to the SS. The resource assignment (UL_MAP) information is delivered in a UL-MAP burst and the power control command is set in a DL burst containing a predetermined control message.

The SS determines its uplink transmit power according to the power control command in step 207 and transmits packets using the allocated resources in step 209. Thereafter, step 203 (BS scheduling) through step 209 (uplink transmission) are repeated.

As described before, the power control command is selectively transmitted in the closed-loop power control. Only if the channel status is changed and the SNR of an uplink received signal is changed, does the BS transmit a power control command to the SS. In the absence of the power control command, the SS determines its uplink transmit power based on the previous uplink transmit power by $$P_{new} = P_{Last}SNR_{New} - SNR_{Last} + (BW_{New} - BW_{Last}) \quad (3)$$

where $P_{new}$ and $P_{Last}$ denote the new transmit power and the previous transmit power, respectively, $SNR_{New}$ and $SNR_{Last}$ denote a required new SNR and the previous required SNR, respectively, and $BW_{New}$ and $BW_{Last}$ denote a new allocated SNR and the previous allocated SNR, respectively.

FIG. 3 is a diagram illustrating a signal flow for a conventional open-loop power control.

Referring to FIG. 3, the SS transmits a reference signal and information about the uplink transmit power of the reference signal (UL_Tx, Power) in an uplink burst to the BS in step 301.

In step 303, the BS (scheduler) calculates the received SNR of the reference signal and determines resources, an MCS level, and a power increment ΔP for the SS by Equation (1). Headroom involved in Equation (1) can be calculated using the information of the transmit power (UL_Tx, Power).

In step 305, the BS allocates the uplink resources to the SS according to the scheduling (UL_MAP) and transmits the uplink resource assignment (UL_MAP) information to the SS. Compared to the closed-loop power control, a power control command is not transmitted in the open-loop power control. Instead, the BS broadcasts in a DL-MAP burst $P_{DL,TX}$ and $NI_{UL,RX}$ necessary for the computation of Equation (2) to all of the SSs.

The SS determines its uplink transmit power using the resource assignment information by Equation (2) in step 307 and transmits an uplink signal using the allocated resources in step 309. At the same time, the SS tells the BS the current transmit power. Thereafter, step 303 (BS scheduling) through step 309 (uplink transmission) are repeated.

As described earlier, in contrast to the closed-loop power control, the open-loop power control scheme provide to the BS information about the current uplink transmit power along with the uplink transmission because the SS can change the uplink transmit power freely. Equation (2) that the SS uses in deciding the transmit power includes a channel variation which is not known to the BS and thus the headroom of the SS is changed, unnoticed by the BS. Therefore, the SS tells the BS the current transmit power at every uplink transmission so that the BS can update the headroom.

On the other hand, in the closed-loop power control, the transmit power of the SS is changed by a power control command from the BS or a transmit power calculation formula (Equation (3)) known to the BS. Accordingly, the BS can distinguish a transmit power change from a channel change in the SNR estimate of an uplink signal. That is, the BS can execute a power control taking the channel change into account, as shown in Equation (1). The headroom can also be calculated using the previous headroom and the previous power control command or using the transmit power of the SS that the bas station can estimate by Equation (3). Consequently, the SS does not need to notify the BS of its transmit power at every uplink transmission in the closed-loop power control.

The features of the two power control schemes are summarized below in Table 1.

TABLE 1

|  | Closed-loop power control | Open-loop power control |
| --- | --- | --- |
| Downlink feedback | Power control command | $P_{DL,TX}$, $NI_{UL,RX}$ |
| Uplink feedback | none | Uplink transmit power |
| Scheduling margin | $MARGIN_{TX}$ | $MARGIN_{TX}$ |
| Maximum transmit power margin | $MARGIN_{TX}$ | $MARGIN_{RX}$ |

As noted from Table 1, the closed-loop and open-loop power control schemes differ in uplink/downlink feedback, scheduling margin, and maximum transmit power margin. The uplink/downlink feedback has been described before. The scheduling margin is $MARGIN_{TX}$ in both power control schemes because a scheduling time point coincides with an actual uplink transmission time in them. The maximum transmit power margin is defined as the maximum difference between a required transmit power satisfying $SNR_{req}$ at the receiver and an actual transmit power. For the closed-loop power control, the maximum transmit power margin is $MARGIN_{TX}$ since the actual transmit power is decided at scheduling. For the open-loop power control, the actual transmit power is decided by Equation (2) and thus the maximum transmit power margin is $MARGIN_{RX}$. The scheduling margin leads to resource assignment loss, and the maximum transmit power margin results in an increase in total system interference.

If the SS moves slowly, the closed-loop power control performs better on the whole. Because the channel does not change much at a low mobile velocity, the power control command is not issued frequently and thus the amount of downlink feedback information is small. $MARGIN_{TX}$ affected by the channel variation is also very small. Also, the scheduling is done and the transmit power is decided according to the actual uplink channel status, as in Equation (1). Therefore, the uplink power control can be performed with high reliability.

On the contrary, if the SS moves fast, the open-loop power control outperforms the closed-loop power control. The channel changes greatly at a high mobile velocity and thus the number of occurrences of the power control command in the closed-loop power control is approximately equal to the number of transmit power feedbacks in the open-loop power control. However, because $MARGIN_{TX} \geq MARGIN_{RX}$, the closed-loop power control tracks the channel variation consuming much resources, or cannot track the channel variation at all. As a result, the closed-loop power control causes greater interference than the open-loop power control in the case where the SS moves fast.

SUMMARY OF THE INVENTION

As described above, the closed-loop and open-loop power control schemes offer their benefits according to the velocity of the mobile terminal. Nevertheless, conventional systems adopt only one of the two power control schemes. In another case, the open-loop power control applies to an initial access, and the closed-loop power control applies thereafter. Thus, the conventional systems do not fully utilize the advantages of the closed-loop and open-loop power control schemes.

An object of the present invention is to substantially solve at least the above problems and/or disadvantages and to provide at least the advantages below. Accordingly, an object of the present invention is to provide an apparatus and method for adaptively determining a power control scheme according to mobile velocity in a mobile communication system.

Another object of the present invention is to provide an apparatus and method for adaptively determining a power control scheme according to mobile velocity in an OFDM/OFDMA TDD mobile communication system.

The above objects are achieved by providing an apparatus and method for adaptively changing an uplink power control scheme according to mobile status in a TDD mobile communication system.

According to an aspect of the present invention, a broadband wireless communication system supporting an open loop power control and a closed loop power control is provided. The system includes a Subscriber Station (SS) for transmitting a power control change request message to a Base Station (BS) to change the power control scheme, and the BS for deciding to change the power control scheme between the open loop power control and closed loop power control, and transmitting a power control change response message the SS including the decided power control scheme. The power control change response message includes a power control mode change field indicating the decided power control scheme, a start frame field indicating a frame number as to when the indicated power control scheme is activated, a power adjust field indicating the change in power level that the SS should apply to its current transmission power, if the indicated power control scheme is the closed-loop power control, and an $Offset_{perSS}$ field indicating a change in power level that the SS should apply to an open loop power control formula, if the indicated power control scheme is the open-loop power control.

According to another aspect of the present invention, an apparatus for a Base Station (BS) in a wireless communication system supporting at least two uplink power control schemes is provided. The apparatus includes a reception modem for receiving from a Subscriber Station (SS), a power control change request message including information about a requested power control scheme, and a transmission modem for transmitting a power control change command message to the SS. The power control change request message includes a power control mode change field indicating a power control scheme requested by the SS, and an UpLink (UL) Transmission (Tx) power field indicating a transmit power of an uplink burst that carries the power control change request message. The power control change command message includes a power control mode change field indicating the decided power control scheme, a start frame field indicating a frame number at which the indicated power control scheme is activated, a power adjust field indicating the change in power level that the SS should apply to its current transmission power, if the indicated power control scheme is a closed-loop power control, and an $Offset_{perSS}$ field indicating a change in power level that the SS should apply to an open loop power control formula, if the indicated power control scheme is an open-loop power control.

According to another aspect of the present invention, an apparatus for determining an uplink power control scheme in an SS for a wireless communication system supporting at least two uplink power control schemes is provided. The apparatus includes a transmission modem for transmitting, to a BS, a power control change request message including information about a requested power control scheme, and a reception modem for receiving a power control change command message from the BS. The power control change request message included a power control mode change field indicating the requested power control scheme by the SS, and an Uplink (UL) Transmission (Tx) power field indicating a transmit power of an uplink burst that carriers the power control change request message. The power control change command message includes a power control mode change field indicating the decided power control scheme, a start frame field indicating a frame number at which the indicated power control scheme is activated, a power adjust field indicating the change in power level that the SS should apply to its current transmission power if the indicated power control scheme is a closed-loop power control, and an $Offset_{perSS}$ field indicating a change in power level that the SS should apply to an open loop power control formula if the indicated power control scheme is an open-loop power control.

According to another aspect of the present invention, an apparatus for a BS in a wireless communication system supporting at least two uplink power control schemes is provided. The apparatus includes an uplink power controller for deciding a power control scheme for an uplink of an SS, and a transmission modem for transmitting a power control change command message including information about the decided power control scheme to the SS. The power control change command message includes a power control mode change field indicating the decided power control scheme, a start frame field indicating a frame number at which the indicated power control scheme is activated, a power adjust field indicating a change in power level that the SS should apply to its current transmission power, if the indicated power control scheme is a closed-loop power control, and an Offset$_{perSS}$ field indicating a change in power level that the SS should apply to an open loop power control formula, if the indicated power control scheme is an open-loop power control.

According to another aspect of the present invention, an apparatus for an SS in a wireless communication system supporting at least two power control schemes is provided. The apparatus includes a reception modem for receiving a power control change command message from a BS, a Media Access Control (MAC) block for extracting information about a decided power control scheme from the power control change command message, and a power controller for selecting a power control scheme according to the extracted information, and determining a transmit power of an uplink signal according to the selected power control scheme. The power control change command message includes a power control mode change field indicating the decided power control scheme, a start frame field indicating a frame number at which the indicated power control scheme is activated, a power adjust field indicating a change in power level that the SS should apply to its current transmission power, if the indicated power control scheme is a closed-loop power control, and an Offset$_{perSS}$ field indicating a change in power level that the SS should apply to an open loop power control formula, if the indicated power control scheme is an open-loop power control.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EMBODIMENTS OF THE INVENTION

Embodiments of the present invention will be described herein below with reference to the accompanying drawings. In the following description, well-known functions or constructions are not described in detail since they would obscure the invention in unnecessary detail.

The present invention is intended to provide an apparatus and method for selecting a closed-loop power control scheme or an open-loop power control scheme for uplink power control according to mobile status in a mobile communication system. While the present invention will be described in the context of an IEEE 802.16e communication system, for the sake of convenience, the power control scheme changing method of the present invention is applicable to all other TDD communication systems.

Figure 4:
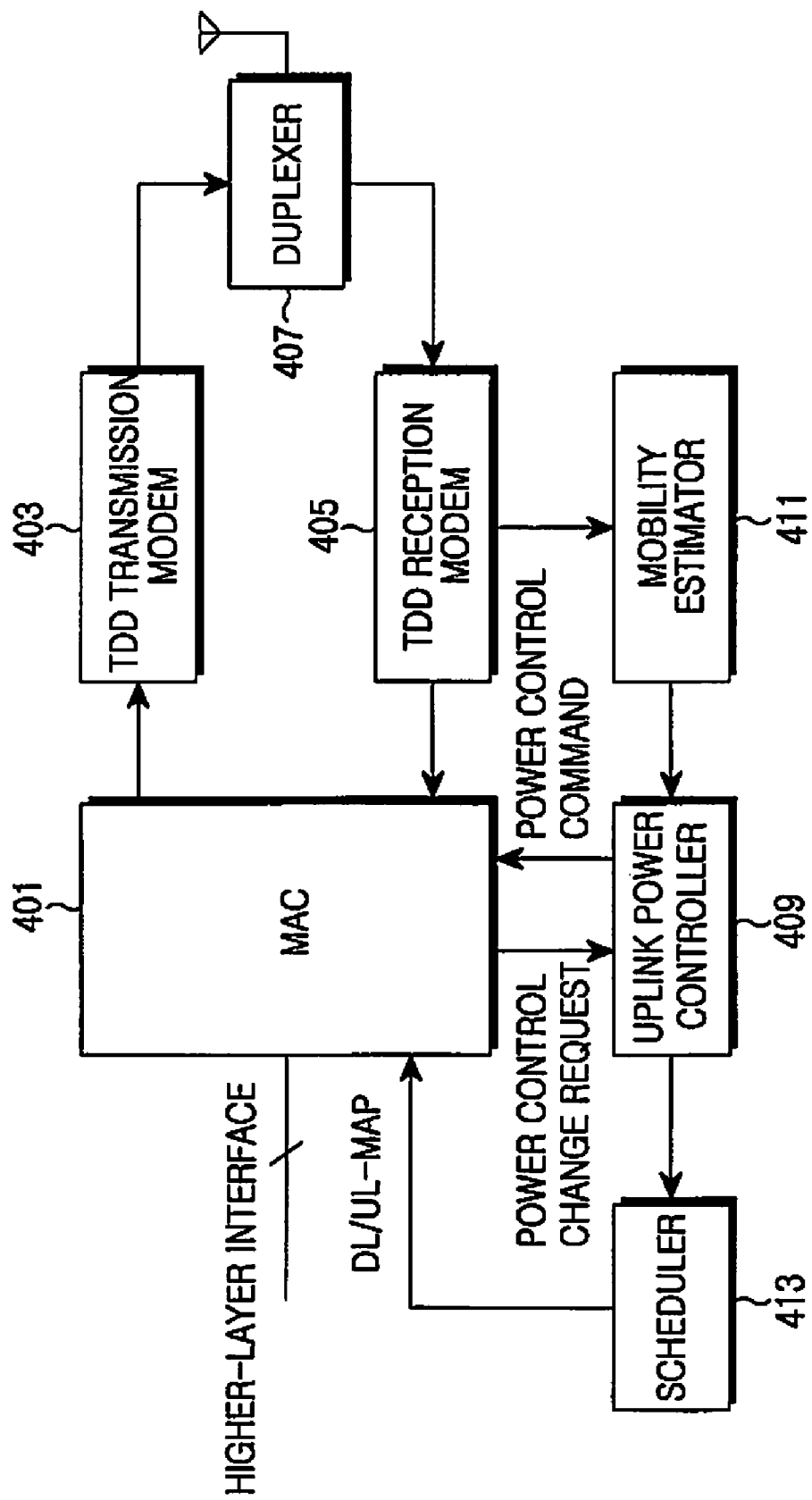
FIG. 4 is a block diagram of a BS in a TDD communication system according to an embodiment of the present invention.

FIG. 4 is a block diagram of a BS in a TDD communication system according to an embodiment of the present invention. The BS includes a MAC entity 401 connected to a higher layer, a TDD transmission MODEM 403, a TDD reception MODEM 405, a duplexer 407, an uplink power controller 409, a mobility estimator 411, and a scheduler 413.

Referring to FIG. 4, the MAC entity 401 receives transmission data from the higher layer and processes the received data in compliance with the connection protocol of the TDD transmission MODEM 403. The MAC entity 401 receives data from the TDD reception MODEM 405, processes the received data in compliance with the connection protocol of the higher layer, and provides the processed data to the higher layer.

The TDD transmission MODEM 403, which includes a channel encoder, a modulator, and an RF transmission unit, converts the data received from the MAC entity 401 to a form suitable for radio transmission. The modulator performs spreading in a code division multiple access (CDMA) communication system, and OFDM modulation (IFFT) in an OFDM communication system.

The TDD reception MODEM 405, which includes an RF reception unit, a demodulator, and a channel decoder, recovers a radio signal received from the duplexer 407, and provides the recovered signal to the MAC entity 401.

The duplexer 407 provides a signal received in TDD from an antenna (uplink signal) to the TDD reception MODEM 405, and provides the transmission signal received from the TDD transmission MODEM 403 (downlink signal) to the antenna.

The scheduler 413 schedules uplink and downlink data transmission according to data transmission status and the channel statuses of the individual SSs, and orders the SSs to transmit and receive data as scheduled. In an IEEE 802.16 communication system, for example, the scheduler 413 generates UL-MAP and DL-MAP as uplink and downlink configuration information, and the MAC entity 401 receives an uplink signal and transmits a downlink signal according to the UL-MAP and DL-MAP from the scheduler 413.

The mobility estimator 411 determines a mobility index by estimating the mobility status of an individual SS from a radio signal received from the SS. Many mobility status estimation algorithms are available and any one of them can be assumed to be used herein. In accordance with the embodiment of the present invention, a higher mobility index indicates a higher mobile velocity.

The uplink power controller 409 is responsible for the closed-loop or open-loop power control. It determines the resources and an MCS level available to each mobile terminal in a predetermined method (e.g. Equation (1)) and tells the scheduler 413 the determined resources and the MCS level. In the case of the closed-loop power control, the uplink power controller 409 generates a power control command for an individual SS to the MAC entity 401. The power control schemes have been described in detail and their description is not provided herein.

In accordance with the present invention, the uplink power controller 409 determines a power control scheme for the SS based on the mobility index received from the mobility estimator 411. This determination can be made every set time period or upon receipt from the SS of a power control change request. If the power control scheme is changed for the SS, the uplink power controller 409 provides to the MAC entity 401 a power control command for the SS. The MAC entity generates a power control change command message according to the power control change command and provides it to the TDD transmission MODEM 403.

Figure 5:
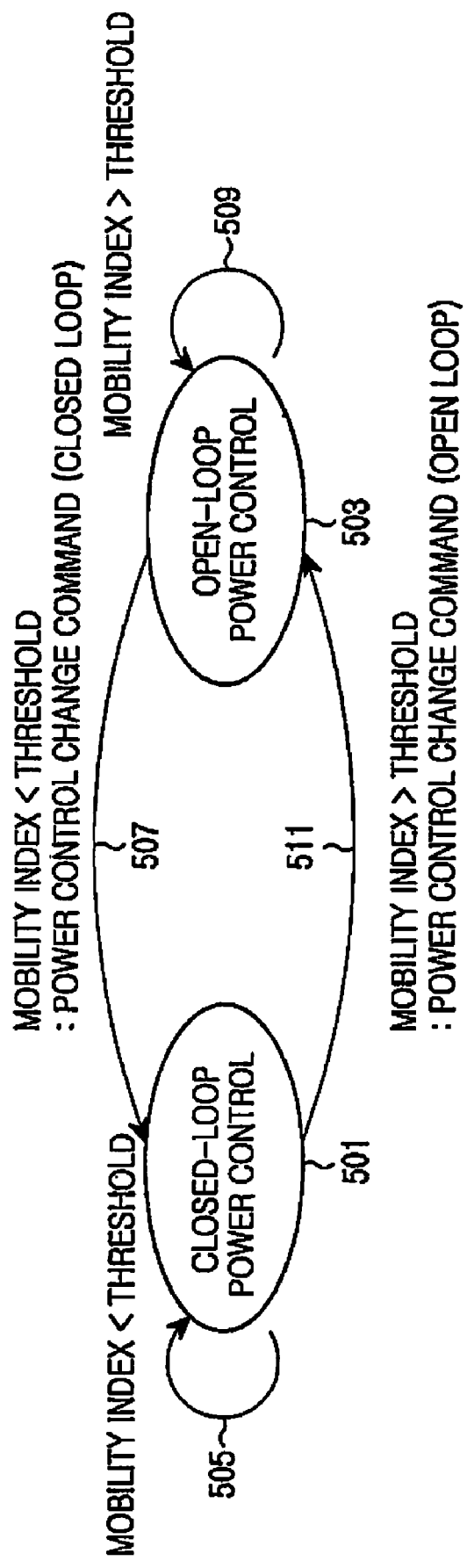
FIG. 5 is a diagram illustrating power control state transitions of the BS depending on which power control scheme is selected in the TDD communication system according to an embodiment of the present invention.

FIG. 5 is a diagram illustrating power control state transitions of the BS depending on which power control scheme is selected in the TDD communication system according to an embodiment of the present invention.

Referring to FIG. 5, a status variable called power control mode change (PMC) is used in deciding a power control scheme. If PMC is '0', it indicates selection of the closed-loop power control. If the PMC is '1', it indicates selection of the open-loop power control.

In the state where PMC=0, if the mobility index received from the mobility estimator 411 is less than a threshold, the state PMC=0 is kept, as indicated by reference numeral 505. If the mobility index is greater than the threshold, the state PMC=0 is transitioned to the state PMC=1, as indicated by reference numeral 511. Similarly, in the state where PMC=1, if the mobility index is greater than the threshold, the state PMC=1 is kept, as indicated by reference numeral 509. If the mobility index is less than the threshold, the state PMC=1 is transitioned to the state PMC=0, as indicated by reference numeral 507. If the PMC value is changed, this implies that a different power control scheme from the previous one has been selected. Thus, a power control change command is transmitted to the SS, notifying the SS of the change of the power control scheme.

With reference to the state transition diagram of FIG. 5, the operation of the BS will be described below.

Figure 6:
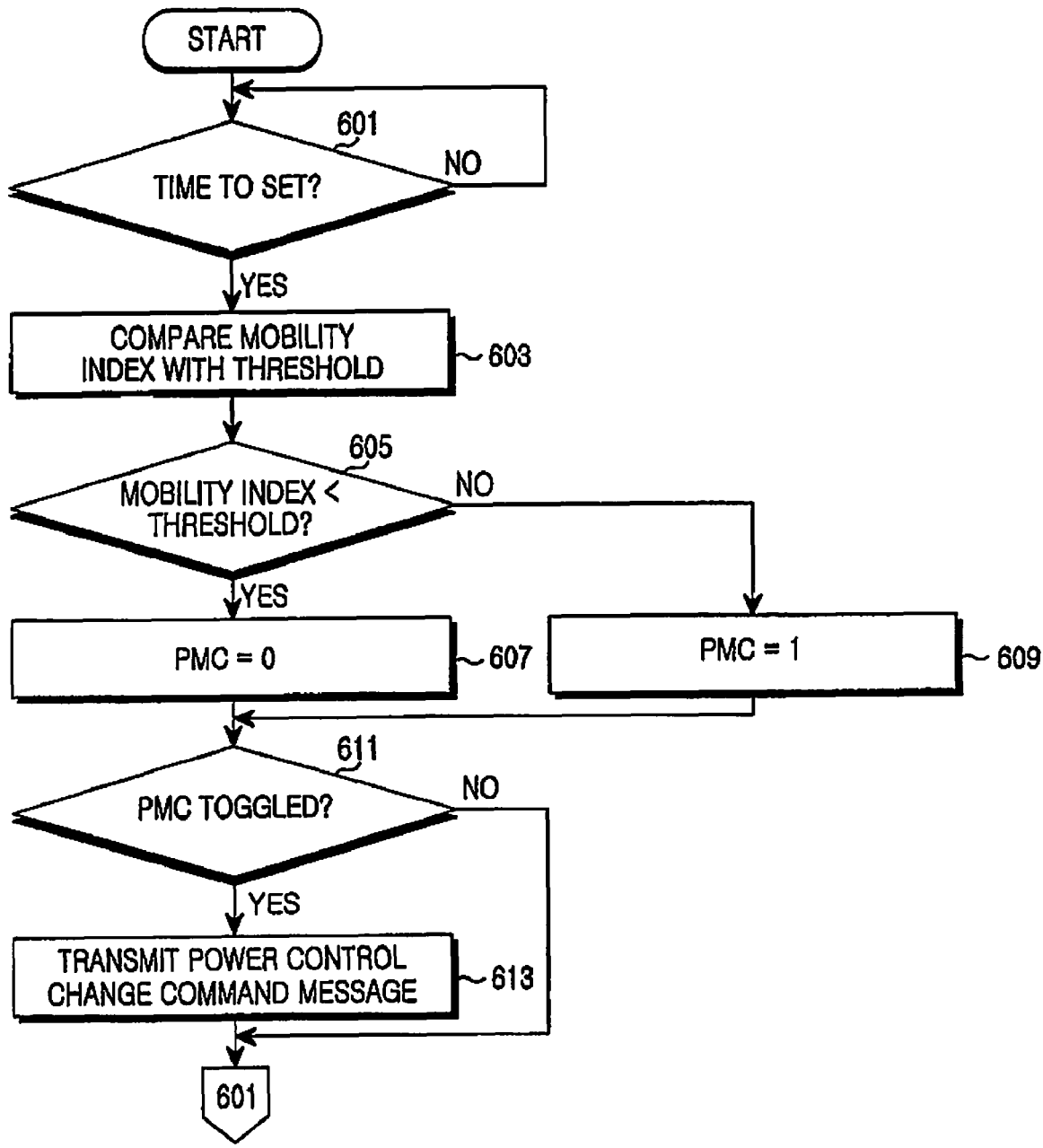
FIG. 6 is a flowchart illustrating an operation for determining an uplink power control scheme in the BS in the TDD communication system according to an embodiment of the present invention.

FIG. 6 is a flowchart illustrating an operation for determining in the BS an uplink power control scheme in the TDD communication system according to an embodiment of the present invention. As stated before, a decision can be made as to which power control scheme is to be used at a set time period or upon receipt of a power control change request from the SS. These two methods can also be used in combination. The following description is made under the assumption that the decision is made periodically.

Referring to FIG. 6, the BS determines if a predetermined time period has elapsed and thus if it is time to set a power control scheme in step 601. If it is time to set a power control scheme, the mobility estimator 411 compares a calculated mobility index with the threshold in step 603. In step 605, the BS compares the mobility index with the threshold. If the mobility index is less than the threshold, the BS sets PMC to 0 in step 607. Since the mobility index being less than the threshold means that the SS moves slowly, the power control scheme is set to the closed-loop power control. On the contrary, if the mobility index is greater than the threshold, the BS sets PMC to 1 in step 609. Since the mobility index being greater than the threshold means that the SS moves fast, the power control scheme is set to the open-loop power control.

In step 611, the BS determines if the PMC has been toggled by comparing the power control scheme set currently with the previous power control scheme. If PMC has not been changed, the BS returns to step 601. If PMC has been changed, the BS transmits to the SS a power control change command message including information the changed power control scheme in step 613 and returns to step 601. The detailed structure of the power control change command message is illustrated below in Table 3.

As described above, the BS decides whether to change the power control scheme and the SS changes its power control scheme only by the power control change command received from the BS.

Figure 7:
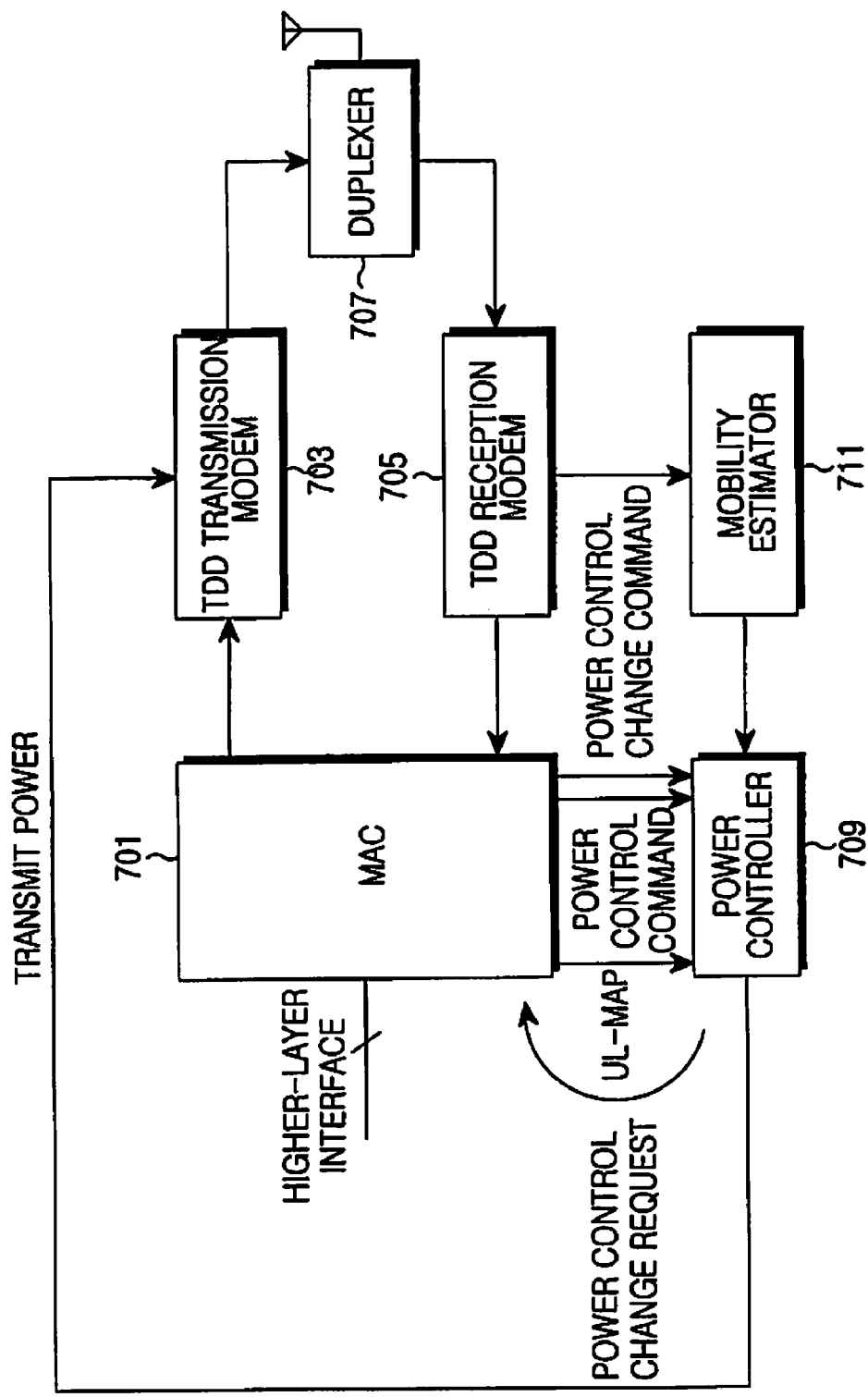
FIG. 7 is a block diagram of an SS in the TDD communication system according to an embodiment of the present invention.

FIG. 7 is a block diagram of the SS in the TDD communication system according to an embodiment of the present invention.

The SS of the present invention includes a MAC entity 701 connected to a higher layer, a TDD transmission MODEM 703, a TDD reception MODEM 705, a duplexer 707, a power controller 709, and a mobility estimator 711.

Referring to FIG. 7, the MAC entity 701 receives transmission data from the higher layer and processes the received data in compliance with the connection protocol of the TDD transmission MODEM 703. The MAC entity 701 receives data from the TDD reception MODEM 705, processes the received data in compliance with the connection protocol of the higher layer, and provides the processed data to the higher layer. The functions of the MAC entity 701 are performed as commanded by the BS scheduler 413. In the IEEE 802.16 communication system, for example, the scheduler 413 generates UL-MAP and DL-MAP as uplink and downlink configuration information, and the MAC entity 701 of the SS receives a downlink signal and transmits an uplink signal according to the DL-MAP and UL-MAP received from the scheduler 413.

The TDD transmission MODEM 703, which includes a channel encoder, a modulator, and an RF transmission unit, converts the data received from the MAC entity 701 to a form suitable for radio transmission. Particularly, the TDD transmission MODEM 703 adjusts the transmit power of the uplink signal according to an uplink transmit power value received from the power controller 709.

The TDD reception MODEM 705, which includes an RF unit, a demodulator, and a channel decoder, recovers a radio signal received from the duplexer 707, and provides the recovered signal to the MAC entity 701. The duplexer 707 provides a signal received in TDD from an antenna (downlink signal) to the TDD reception MODEM 705, and provides the transmission signal received from the TDD transmission MODEM 703 (uplink signal) to the antenna.

The mobility estimator 711 determines a mobility index by estimating the mobility status of the SS from a radio downlink signal received from the BS, and provides the mobility index to the power controller 709. Many mobility status estimation algorithms are available and any one of them can be used herein. In accordance with the embodiment of the present invention, it is assumed that a higher mobility index indicates a higher mobile velocity.

The power controller 709 is responsible for the closed-loop or open-loop power control. For the closed-loop power control, the power controller 709 determines uplink transmit power according to a power control command received from the BS or by Equation (3), and provides the uplink power transmit power value to the TDD transmission MODEM 703. For the open-loop power control, the power controller 709 determines the uplink transmit power by Equation (2) and provides it to the TDD transmission MODEM 703. In the case of calculating the uplink transmit power by Equation (2) or Equation (3), information about required bandwidth and SNR is acquired from the resource assignment information (UL-MAP) received from the BS. These power control schemes have been described before in detail and their description is not provided herein.

In accordance with the present invention, the power controller 709 adaptively selects a power control scheme according to the power control change command received from the BS. To be more specific, the power control change command message is provided to the MAC entity 701 through the TDD transmission MODEM 705. The MAC entity 701 extracts a power control change command indicating a power control scheme from the message. The power controller 709 then selects a power control scheme according to the power control change command received from the MAC entity 701.

The power controller 709 can request changing the uplink power control scheme to the BS. Specifically, the power controller 709 selects a power control scheme according to the mobility index received from the mobility estimator 711 and if the selected power control scheme is different from the previous one, the power controller 709 transmits the power control change request to the MAC entity 701. Thus the MAC entity 701 generates a power control change request message and transmits it to the BS. In this way, the SS only needs to request the change of a power control scheme and the BS makes a final decision about the power control scheme.

Figure 8:
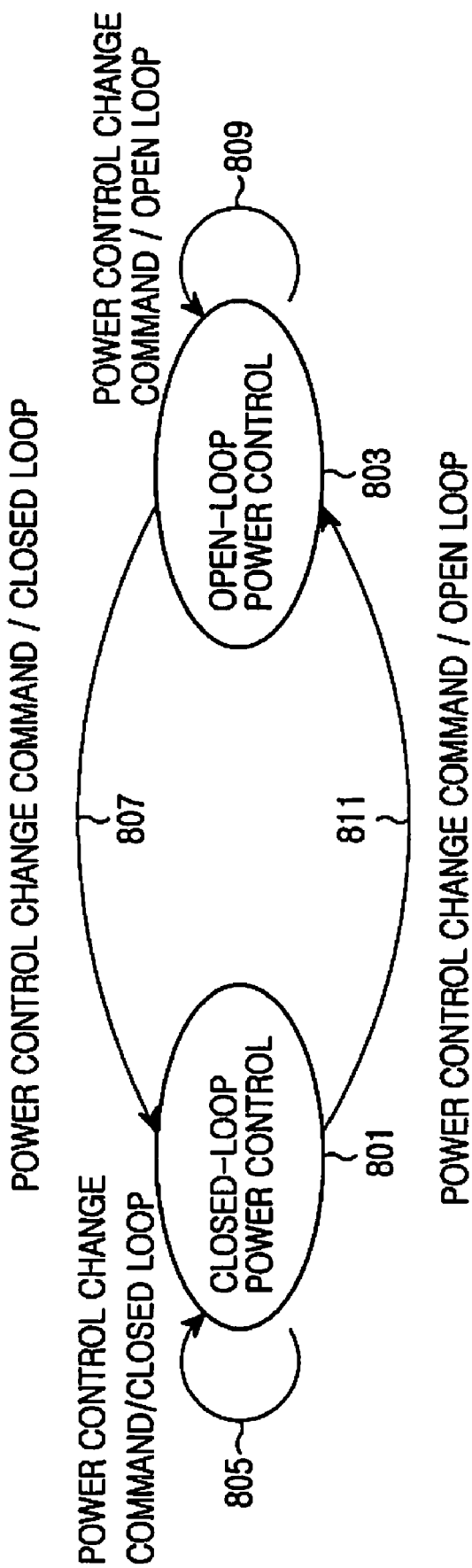
FIG. 8 is a diagram illustrating power control state transition of the SS depending on which power control scheme is selected in the TDD communication system according to an embodiment of the present invention.

FIG. 8 is a diagram illustrating power control state transition of the SS depending on which power control scheme is selected in the TDD communication system according to an embodiment of the present invention.

Referring to FIG. 8, PMC is used in deciding a power control scheme. If PMC is '0', it indicates selection of the closed-loop power control. If the PMC is '1', it indicates selection of the open-loop power control.

In the state where PMC=0, if the power control change command received from the BS indicates the closed-loop power control, the state PMC=0 (closed-loop power control) is kept, as indicated by reference numeral 805. If the power control change command indicates the open-loop power control, the state PMC=0 is transitioned to the state PMC=1 (open-loop power control), as indicated by reference numeral 811. Similarly, in the state where PMC=1, if the power control change command indicates the open-loop power control, the state PMC=1 (open-loop power control) is kept, as indicated by reference numeral 809. If the power control change command indicates the closed-loop power control, the state PMC=1 is transitioned to the state PMC=0 (closed-loop power control), as indicated by reference numeral 807. In this way, the SS determines the power control scheme according to the power control change command from the BS.

With reference to the state transition diagram of FIG. 8, the operation of the SS will be described below.

Figure 9:
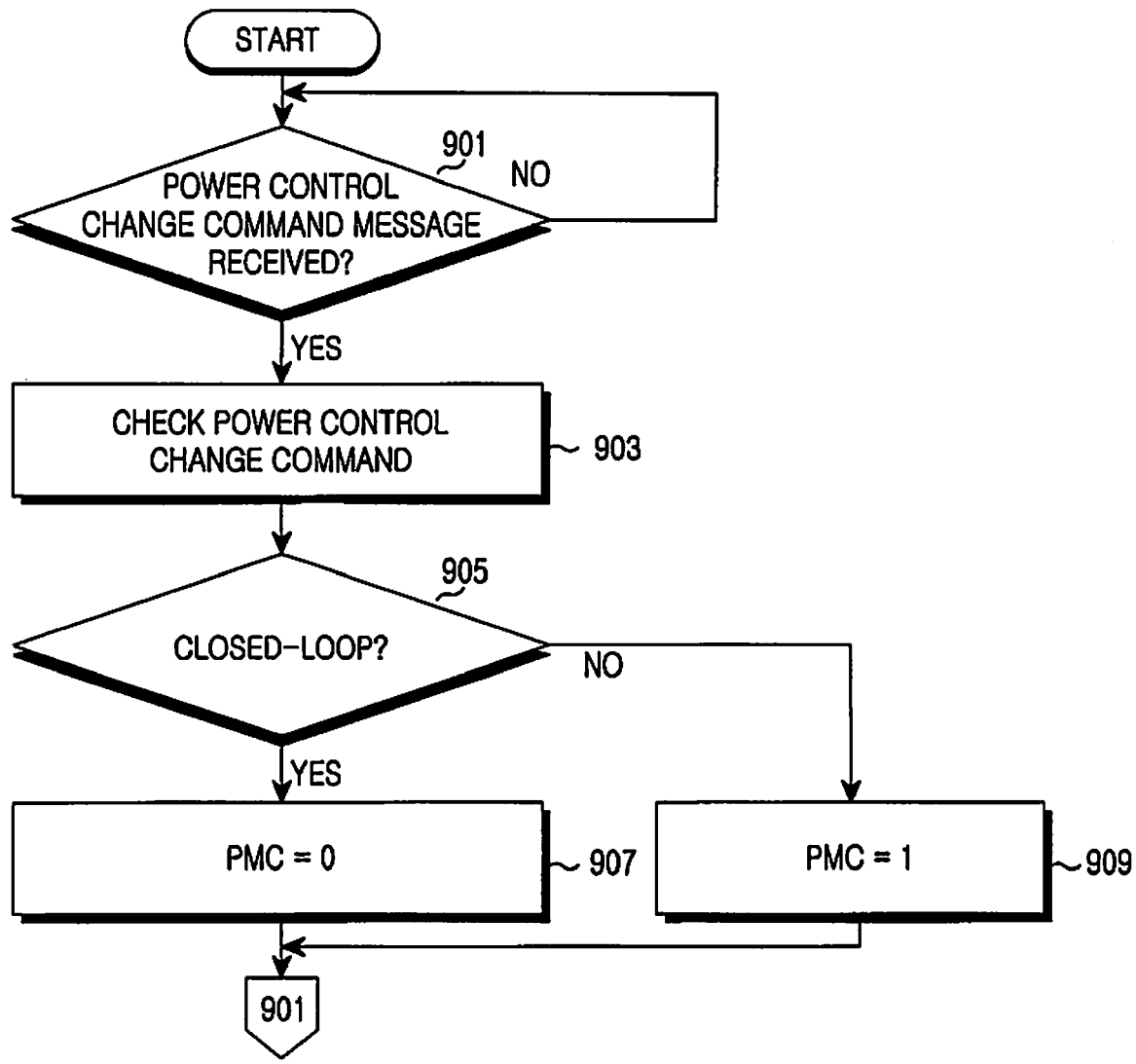
FIG. 9 is a flowchart illustrating an operation for determining an uplink power control scheme in the SS in the TDD communication system according to an embodiment of the present invention.

FIG. 9 is a flowchart illustrating an operation for determining an uplink power control scheme in the SS in the TDD communication system according to an embodiment of the present invention.

Referring to FIG. 9, the SS determines if a power control change command message has been received from the BS in step 901. Upon receipt of the power control change command message, the SS checks in step 903 a power control change command set in the message. In step 905, the SS determines if the power control change command indicates the closed-loop power control. If it does, the SS sets PMC to 0 (closed-loop power control) in step 907 and returns to step 901. If the power control change command indicates the open-loop power control, the SS sets the PMC to 1 (open-loop power control) in step 909 and returns to step 901.

Figure 10:
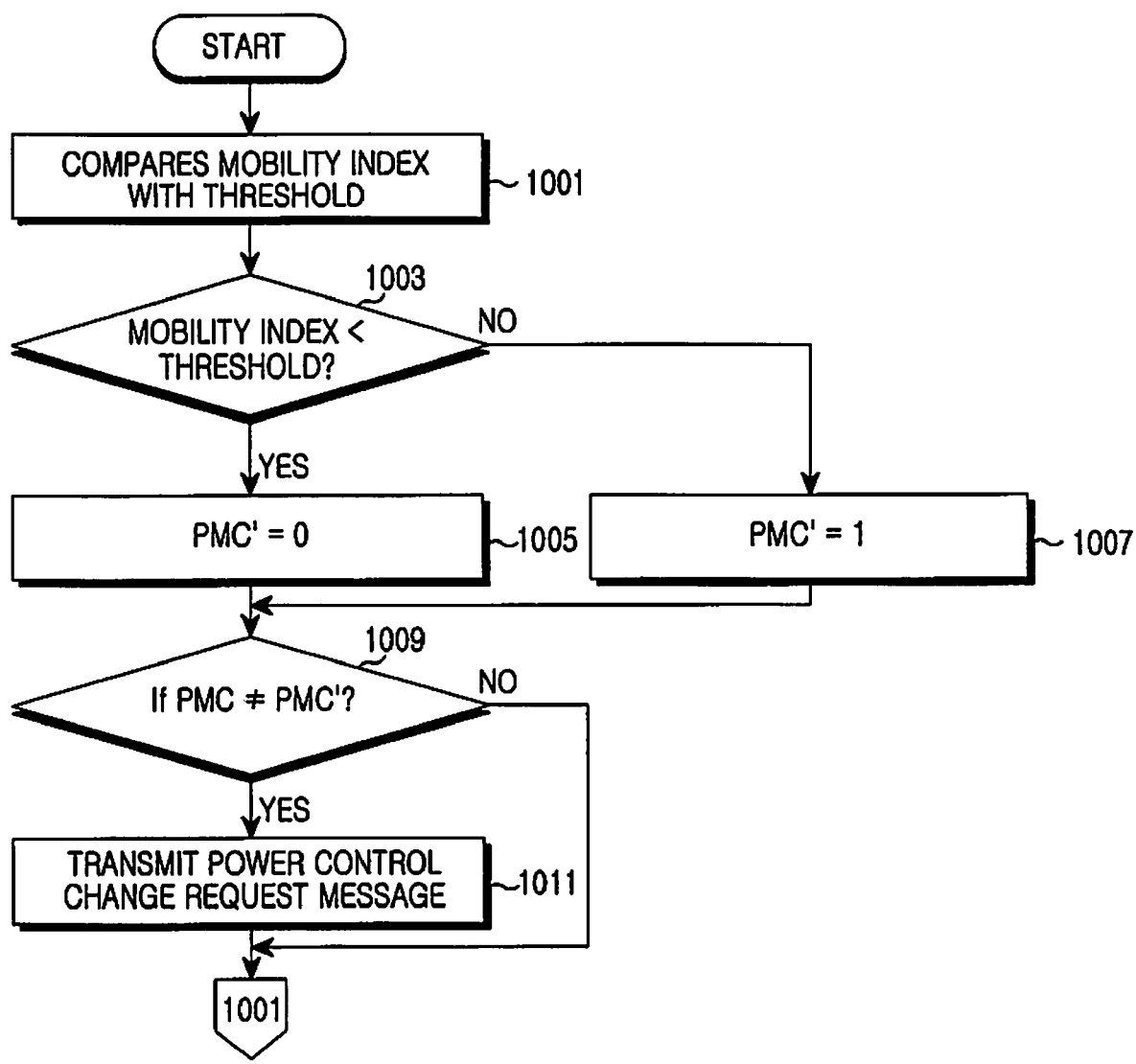
FIG. 10 is a flowchart illustrating an operation for requesting a power control change to the BS in the SS in the TDD communication system according to an embodiment of the present invention.

FIG. 10 is a flowchart illustrating an operation for requesting a power control change to the BS in the SS in the TDD communication system according to an embodiment of the present invention.

Referring to FIG. 10, the SS compares a mobility index calculated by the mobility estimator 711 with a predetermined threshold in step 1001 and determines if the mobility index is less than the threshold in step 1003. If the mobility index is less than the threshold, the SS sets PMC to 0 (closed-loop power control) in step 1005. Since the mobility index being less than the threshold means that the SS moves slowly, the power control scheme is set to the closed-loop power control. On the contrary, if the mobility index is greater than the threshold, the SS sets PMC to 1 (open-loop power control) in step 1007. Since the mobility index being greater than the threshold means that the SS moves fast, the power control scheme is set to the open-loop power control.

In step 1009, the SS determines if PMC has been toggled by comparing the power control scheme set currently (PMC') with the previous power control scheme (PMC). If PMC has not been changed, the SS returns to step 1001. If PMC has been changed, the SS transmits to the BS a power control change request message including information about the changed power control scheme in step 1011 and returns to step 1001. The detailed structure of the power control change request message is illustrated below in Table 2.

Figure 11:
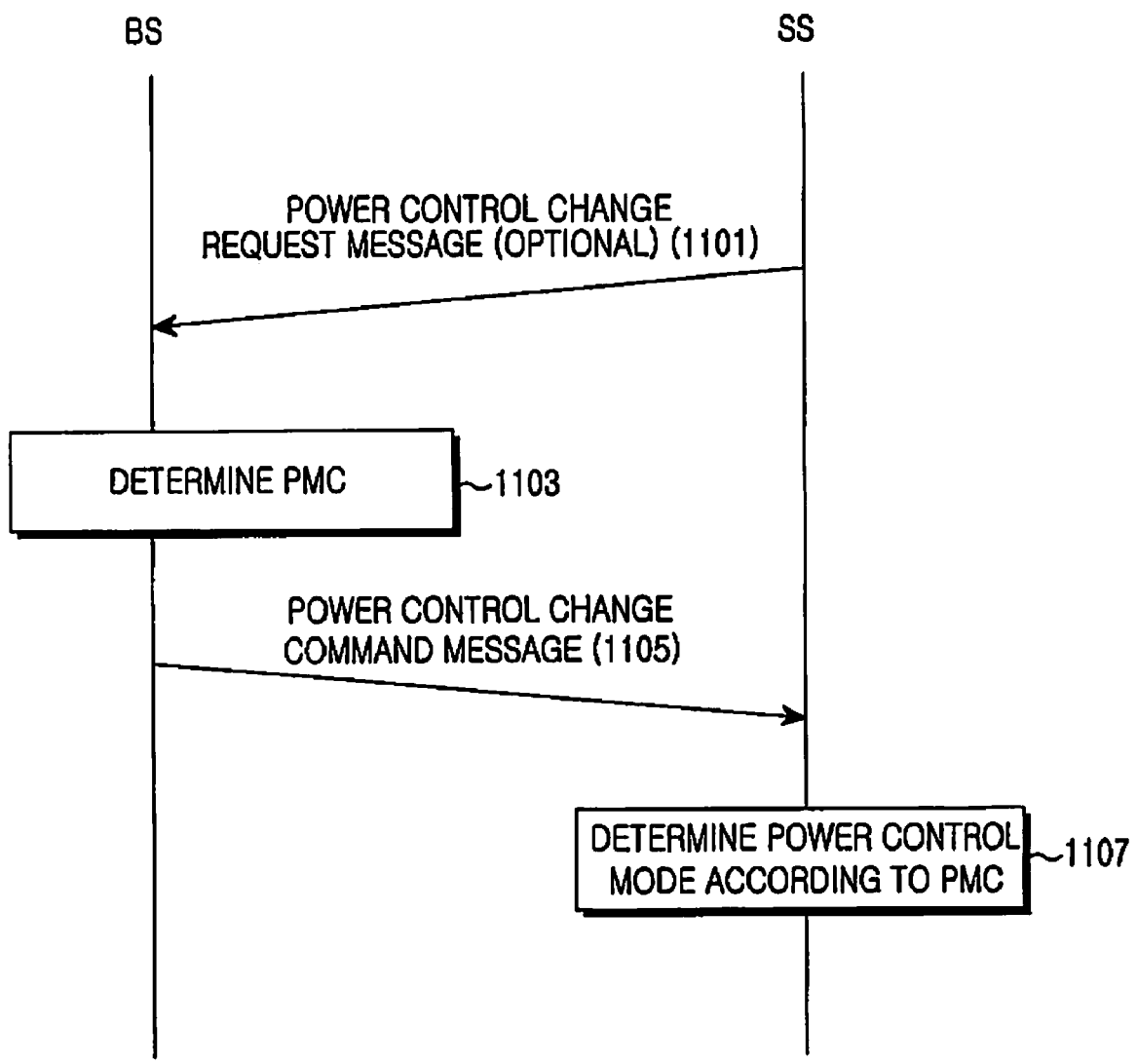
FIG. 11 is a diagram illustrating a flow of messages exchanged between the BS and the SS in the TDD communication system according to an embodiment of the present invention.

FIG. 11 is a diagram illustrating a flow of messages exchanged between the BS and the SS in the TDD communication system according to an embodiment of the present invention. Particularly, the messages are used in the process of requesting changing by the SS a power control scheme to the BS and determining a power control scheme upon receipt of the power control change request by the BS.

Referring to FIG. 11, when it is necessary to change a power control scheme, the SS transmits to the BS in step 1101 a power control change request message including information about a requested power control scheme. The format of the power control change request message is illustrated below in Table 2.

Upon receipt of the power control change request message, the BS determines a power control scheme based on the mobility index of the SS in step 1103. If the determined power control scheme is different from the previous one, the BS transmits to the SS in step 1105 a power control change command message including information about the determined power control scheme. The format of the power control change command message is illustrated below in Table 3.

Upon receipt of the power control change command message, the SS sets in step 1107 a power control scheme according to a power control change command set in the received message.

Figure 1:
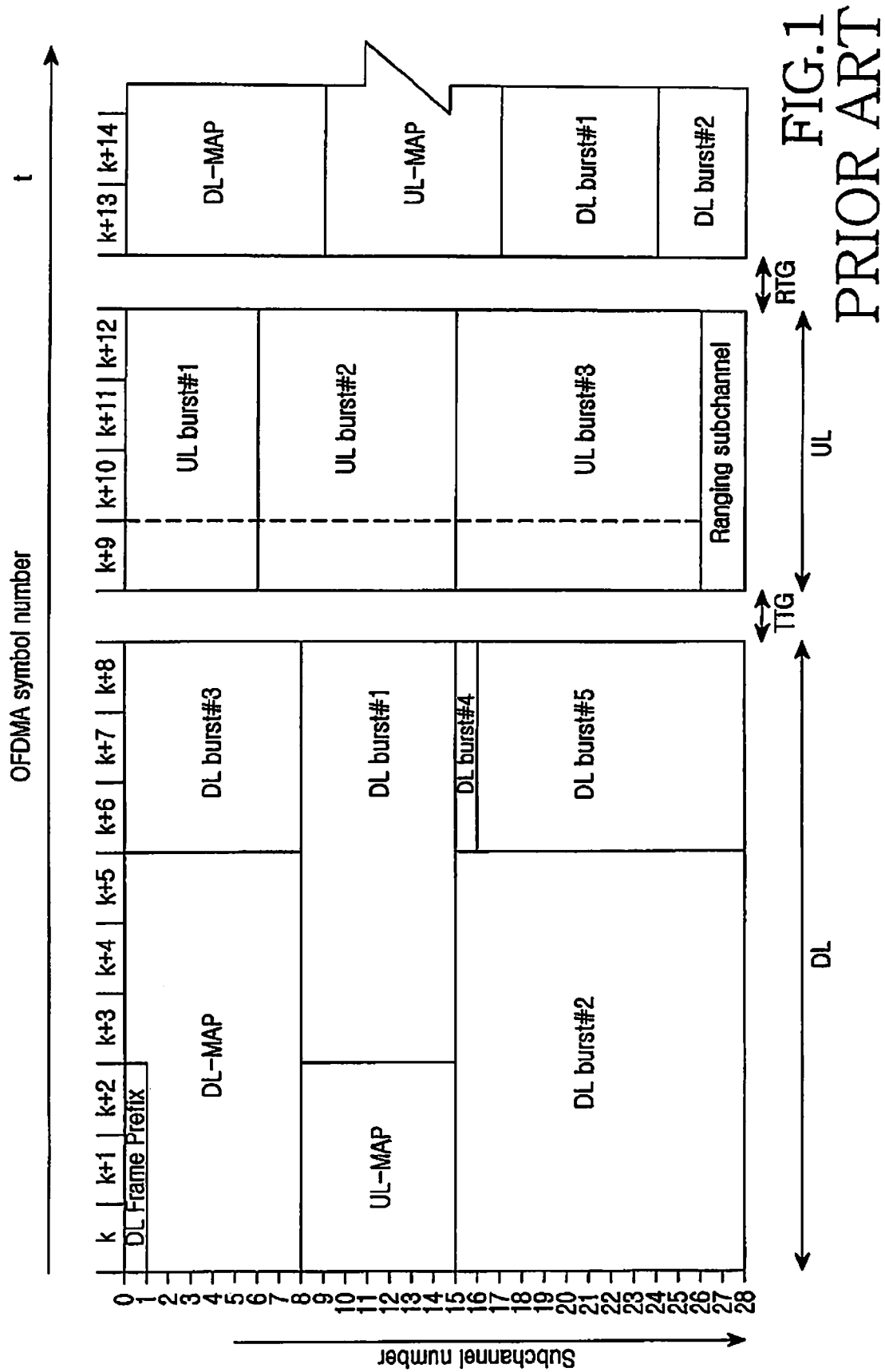
FIG. 1 illustrates an OFDMA uplink/downlink frame structure in an IEEE 802.16 OFDMA system.

As described above, the SS requests the change of a power control scheme and the BS transmits a power control change command to the SS in response to the power control change request. In another case, the BS can transmit the power control change command according to the mobility index to the SS, without receiving the power control change request. The power control change request message is transmitted to the BS in a UL burst and the power control change command message is transmitted to the SS in a DL burst, as illustrated in FIG. 1. Configuration information about the UL burst and the DL burst are delivered to the SS in a UL-MAP burst and a DL-MAP burst. That is, the SS transmits the power control change request message and receives the power control change command message using the MAP information received from the BS.

Table 2 below illustrates an example of the power control change request message depicted in FIG. 11, which can be transmitted from the SS in the IEEE 802.16 communication system. It is delivered to the BS in a UL burst.

TABLE 2

| Syntax | Size | Notes |
|---|---|---|
| PMC_REQ message format{ | | |
|     Management Message Type=62 | 8 bits | Type = 62 |
|     Power control mode change | 1 bit | 0: Closed-loop power control mode<br>1: Open-loop power control mode |
|     UL Tx power | 8 bits | UL Tx power level for the burst that carries this header (11.1.1). When the Tx power is different from slot to slot, the maximum value is reported |
|     Reserved | 7 bits | |
| } | | |

Referring to Table 2, "Management Message Type" is a serial number that identifies the message in the IEEE 802.16 communication system. It can be changed according to a system standardization. "Power control mode change" indicates a requested power control scheme. It is set to '0' for the closed-loop power control and to '1' for the open-loop power control. "UL Tx power" indicates the transmit power value of the uplink burst that delivers the power control change request. Encoding of the transmit power value is performed in compliance with IEEE 802.16, which will not be described in detail herein. The BS can utilize the transmit power value for power control, set in the uplink burst with the power control change request. "Reserved" represents bits inserted to match the total size of the message in bytes.

Table 3 below illustrates an example of the power control change command message depicted in FIG. 11, which can be transmitted from the BS in the IEEE 802.16 communication system. It is delivered to the base mobile in a DL burst.

TABLE 3

| Syntax | Size | Notes |
|---|---|---|
| PMC_RSP message format{ | | |
|     Management Message Type=63 | 8 bits | Type = 63 |
|     Power control mode change | 1 bit | 0: Closed-loop power control mode<br>1: Open-loop power control mode |
|     Start frame | 3 bits | 3 LSBs of frame number when the indicated power control mode is activated |
|     If (Power control mode change=0) | 7 bits | |
|         Power adjust | 8 bits | Signed integer, which expresses the change in power level (in multiples of 0.25 dB) that the SS shall apply to its current transmission power. When subchannelization is employed, the subscriber shall interpret the power offset adjustment as a required change to the transmitted power density |
|     else | | |
|         $Offset_{perSS}$ | 8 bits | Signed integer, which expresses the change in power level (in multiples of 0.2 dB) that the SS shall apply to the open-loop power control formula in 8.4.10.3.1. |
|     Reserved | 4 bits | |
| } | | |

Referring to Table 3, "Management Message Type" is a serial number that identifies the message in the IEEE 802.16 communication system. It can be changed according to a system standardization. "Power control mode change" indicates a requested power control scheme. It is set to '0' for the closed-loop power control and to '1' for the open-loop power control. "Start frame" indicates a frame in which the indicated power control scheme starts to be applied in the IEEE 802.16 communication system. If the indicated power control scheme is the closed-loop power control, a power control command "Power adjust" about the transmit power of the SS is transmitted. In the case of the open-loop power control, an offset value "$Offset_{perSS}$" is transmitted to be reflected in $MARGIN_{RX}$ of Equation (2). This offset value is specific to the SS, like the change of link performance caused by channel selectivity and the diversity gain of BS antennas. In this case, $MARGIN_{RX}$ reflects the channel status of the SS as well as the time delay until the power control scheme is applied.

Table 4 below illustrates an example of a bandwidth request and uplink transmit power report message that can be transmitted by the SS in the IEEE 802.16 communication system.

TABLE 4

| MSB | | | |
|---|---|---|---|
| HT = | EC = | Type(3) = | BR(11) |

TABLE 4-continued

| 1(0) | 1(0) | 011 | |
|---|---|---|---|
| | UL Tx Power (8) | | CID MSB (8) |
| | CID LSB (8) | | HCS (8) |

Figure 2:
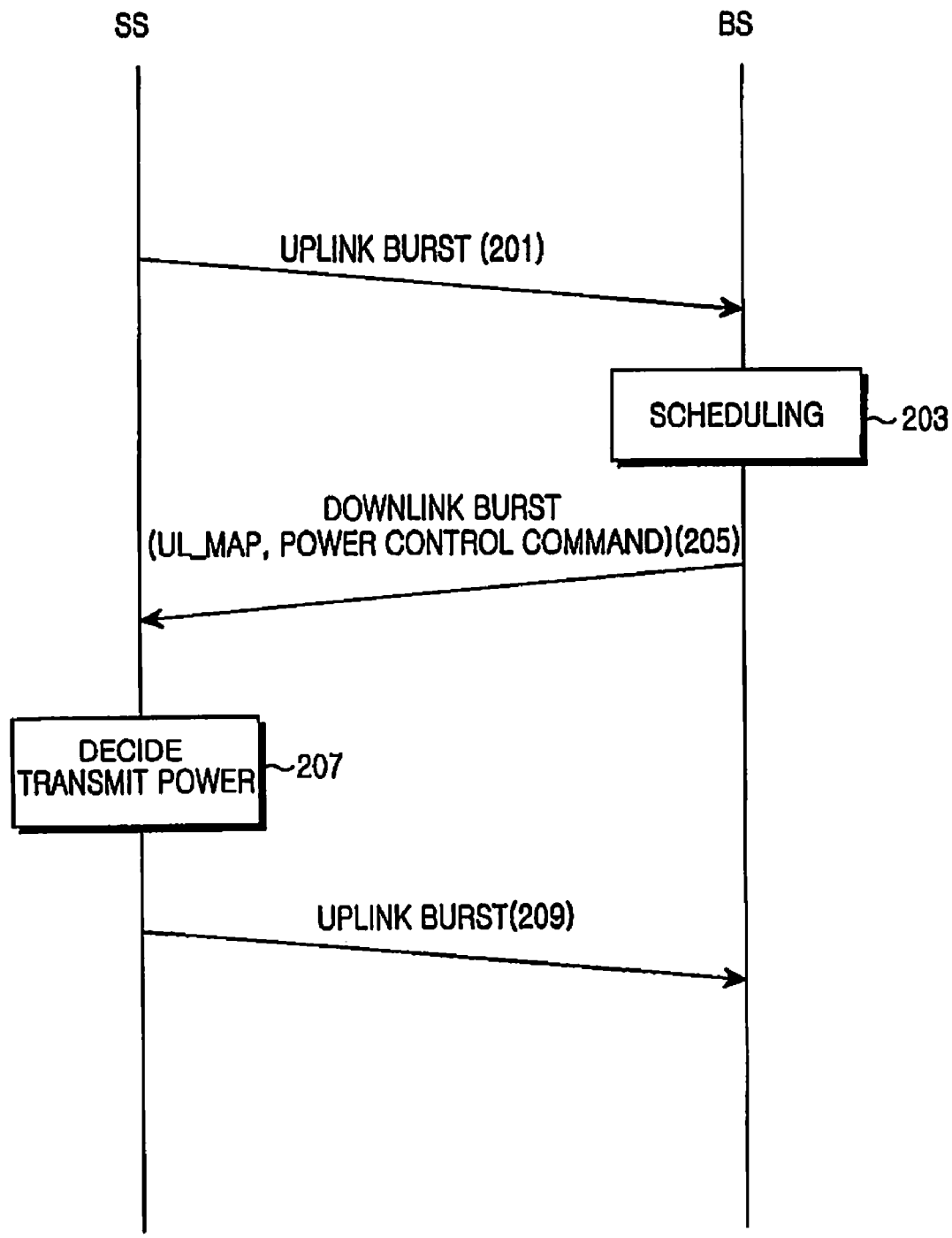
FIG. 2 is a diagram illustrating a signal flow for a conventional closed-loop power control.
Figure 3:
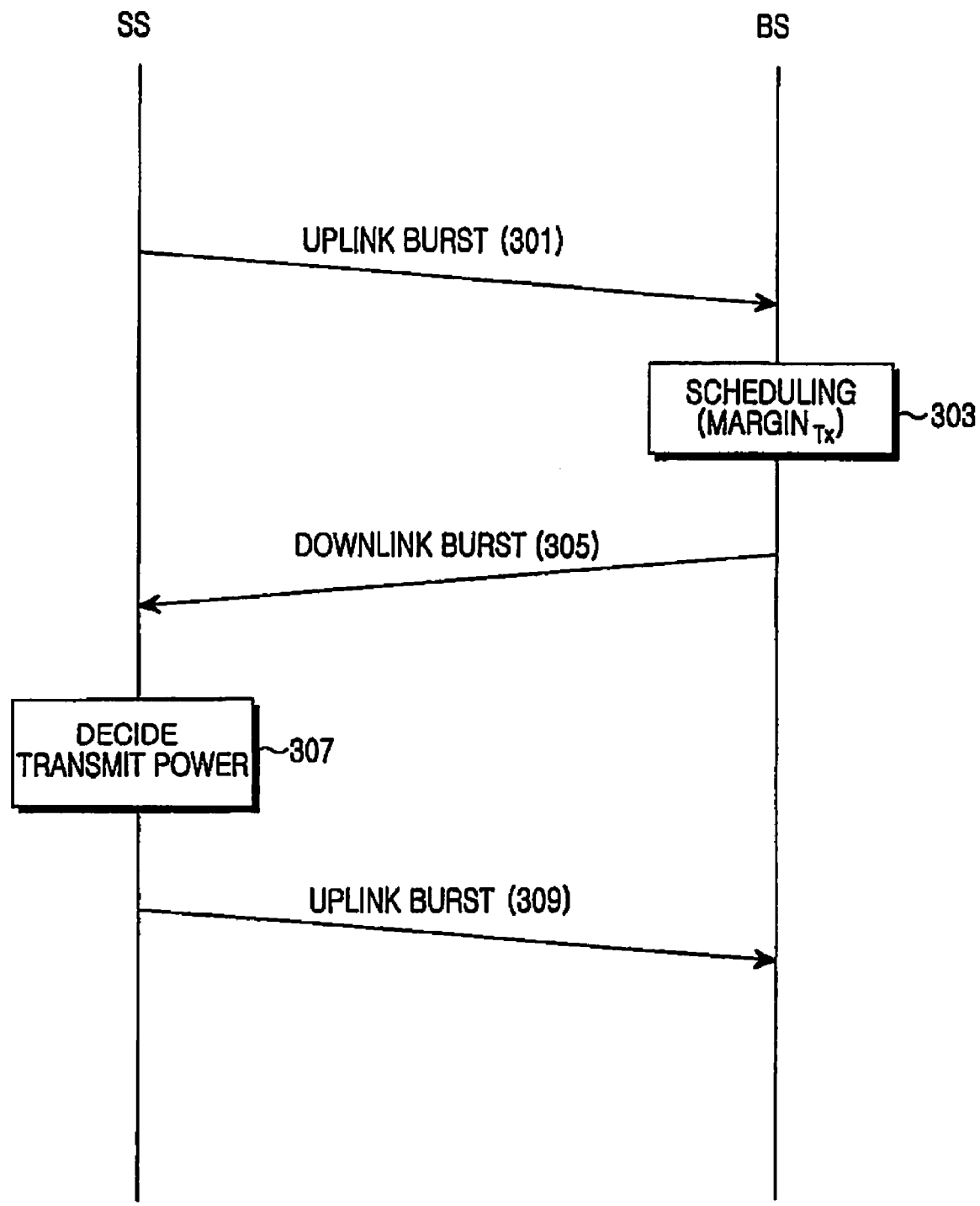
FIG. 3 is a diagram illustrating a signal flow for a conventional open-loop power control.

Referring to Table 4, the bandwidth request and uplink transmit power report message is a modification to an existing IEEE 802.16 bandwidth request message. In general, uplink communications starts with a bandwidth request from the SS in the IEEE 802.16 communication system. Thus, the bandwidth request message was defined in the IEEE 802.16 communication system. Assuming that the uplink communications start with the bandwidth request from the SS, an uplink message transmitted from the SS when the procedure illustrated in FIG. 2 or FIG. 3 can be the bandwidth request message. Yet, this message cannot be used as a reference signal for power control in the procedure because it does not have information about uplink transmit power. Accordingly, the SS transmits a bandwidth request and an uplink transmit power value together in the present invention. In this context, the bandwidth request and uplink transmit power report message illustrated in Table 4 is designed to serve as the reference signal for power control. Particularly, this message is in a control message format called a header according to IEEE 802.16.

In Table 4, "HT (Header Type)" indicates a header type. It is set to '1' all the time. "EC (Encryption Control)" indicates if the payload following the header is encrypted or not. "EC" is always set to '1'. The bandwidth request and uplink transmit power report message is configured to have a header only, without payload. "Type" indicates the type of the bandwidth request header. It can be changed according to standardization. "BR" is short for Bandwidth Request. It indicates the amount of uplink data in bytes. "UL Tx Power" indicates the transmit power value of a UL burst that carries the bandwidth request and uplink transmit power report message. Encoding of the transmit power value performed in compliance with IEEE 802.16, and its description will not be provided herein. The BS can utilize the transmit power for power control transmit, set in the uplink burst with the bandwidth request and uplink transmit power report message. "CID (Connection ID)" is a 16-bit IEEE 802.16 connection ID. "HCS (Header Check Sequence)" is a 8-bit cyclic redundancy check (CRC) value for the message, to be used for error detection in the BS. The CRC operation is based on IEEE 802.16 and its description will not be provided herein.

In accordance with the present invention as described above, an uplink power control scheme is changed in a TDD communication system. Therefore, the uplink power control can be carried out more efficiently. That is, an efficient uplink power control is provided by fully utilizing the advantages of the closed-loop and open-loop power control schemes.

While the invention has been shown and described with reference to certain preferred embodiments thereof, they are merely exemplary applications. For example, while the closed-loop power control and the open-loop power control have been described as available power control schemes, the present invention is applicable to further-divided power control schemes. Therefore, it will be understood by those skilled in the art that various changes in form and details may be made therein without departing from the spirit and scope of the invention as defined by the appended claims.

What is claimed is:

1. A broadband wireless communication system supporting an open loop power control and a closed loop power control, the system comprising:
a Subscriber Station (SS) for transmitting a power control change request message to a Base Station (BS) to change a power control scheme; and
the BS for deciding to change the power control scheme between the open loop power control and the closed loop power control, and for transmitting, to the SS, a power control change response message including a decided power control scheme,
wherein the power control change response message includes a power control mode change field indicating the decided power control scheme, a start frame field indicating a frame number at which the indicated power control scheme is activated, a power adjust field indicating a change in power level that the SS should apply to its current transmission power, if the indicated power control scheme is the closed-loop power control, and an offset field indicating a change in power level that the SS should apply to an open loop power control formula, if the indicated power control scheme is the open-loop power control.

2. An apparatus for a Base Station (BS) in a wireless communication system supporting at least two uplink power control schemes, the apparatus comprising:
a modem for receiving from a Subscriber Station (SS), a power control change request message and
for transmitting a power control change response message to the SS,
wherein the power control change request message includes a first power control mode change field indicating a first power control scheme requested by the SS, and an UpLink (UL) Transmission (Tx) power field indicating a transmit power of an uplink burst that carries the power control change request message, and
wherein the power control change response message includes a second power control mode change field indicating a second power control scheme decided by the BS, a start frame field indicating a frame number at which the second power control scheme is activated, a power adjust field indicating a change in power level that the SS should apply to its current transmission power, if the second power control scheme is a closed-loop power control, and an offset field indicating a change in power level that the SS should apply to an open loop power control formula, if the second power control scheme is an open-loop power control.

3. The apparatus of claim 2, further comprising:
a controller for deciding the second power control scheme for an uplink of the SS, and for comparing the second power control scheme with a previous power control scheme,
wherein the modem transmits the power control change response message to the SS, if the second power control scheme is different from the previous power control scheme.

4. An apparatus for determining an uplink power control scheme in a Subscriber Station (SS) for a wireless communication system supporting at least two uplink power control schemes, the apparatus comprising:
a modem for transmitting, to a Base Station (BS), a power control change request message and for receiving, from the BS, a power control change response message,
wherein the power control change request message includes a first power control mode change field indicating a first power control scheme requested by the SS, and an Uplink (UL) Transmission (Tx) power field indicating a transmit power of an uplink burst that carriers the power control change request message, and
wherein the power control change request message includes a second power control mode change field indicating a second power control scheme decided by the BS, a start frame field indicating a frame number at which the second power control scheme is activated, a power adjust field indicating a change in power level that the SS should apply to its current transmission power, if the second power control scheme is a closed-loop power control, and an offset field indicating a change in power level that the SS should apply to an open loop power control formula, if the second power control scheme is an open-loop power control.

5. The apparatus of claim 4, further comprising:
a controller for determining whether to change a power control scheme based on a velocity of the SS.

6. The apparatus of claim 4, further comprising:
a controller for deciding the first power control scheme according a status of the SS, and for comparing the decided first power control scheme with a previous power control scheme,
wherein the modem transmits the power control change request message to the BS, if the decided first power control scheme is different from the previous power control scheme.

7. The apparatus of claim 4, wherein the modem transmits a bandwidth request message to the BS, if the SS requests a bandwidth from the BS,
wherein the bandwidth request message includes a Bandwidth Request (BR) field indicating an amount of uplink data to be transmitted and an UL Tx power field indicating a transmit power of an uplink burst that carries the bandwidth request message.

8. An apparatus for a Base Station (BS) in a wireless communication system supporting at least two uplink power control schemes, the apparatus comprising:
a controller for deciding a power control scheme for an uplink of a Subscriber Station (SS); and
a modem for transmitting a power control change response message including information about a decided power control scheme to the SS,
wherein the power control change response message includes a power control mode change field indicating the decided power control scheme, a start frame field indicating a frame number at which the indicated power control scheme is activated, a power adjust field indicating a change in power level that the SS should apply to its current transmission power, if the indicated power control scheme is a closed-loop power control, and an offset field indicating a change in power level that the SS should apply to an open loop power control formula, if the indicated power control scheme is an open-loop power control.

9. The apparatus of claim 8, wherein the controller decides the power control scheme, upon request from the SS.

10. The apparatus of the claim 8, wherein the controller compares the decided power control scheme with a previous power control scheme, and
wherein the modem transmits the power control response message to the SS, if the decided power control scheme is different from the previous power control scheme.

11. An apparatus for a Subscriber Station (SS) in a wireless communication system supporting at least two power control schemes, the apparatus comprising:
a modem for receiving a power control change response message from a Base Station (BS); and
a controller for determining a transmit power of an uplink signal according to the power control response message;
wherein the power control change response message includes a power control mode change field indicating a power control scheme decided by the BS, a start frame field indicating a frame number at which the indicated power control scheme is activated, a power adjust field indicating a change in power level that the SS should apply to its current transmission power, if the indicated power control scheme is a closed-loop power control, and an offset field indicating a change in power level that the SS should apply to an open loop power control formula, if the indicated power control scheme is an open-loop power control.

12. The apparatus of claim 11, wherein the
modem transmits a bandwidth request message to the BS, if the SS requests bandwidth from the BS,
wherein the bandwidth request message includes a Bandwidth Request (BR) field indicating an amount of uplink data to be transmitted and an UpLink (UL) Transmission (Tx) power field indicating a transmit power of an uplink burst that carries the bandwidth request message.

* * * * *